April 12, 1955     C. J. BRAUER     2,705,815
METHOD FOR COLLECTION AND MOUNTING OF CHILDREN'S TEETH
Filed April 19, 1952
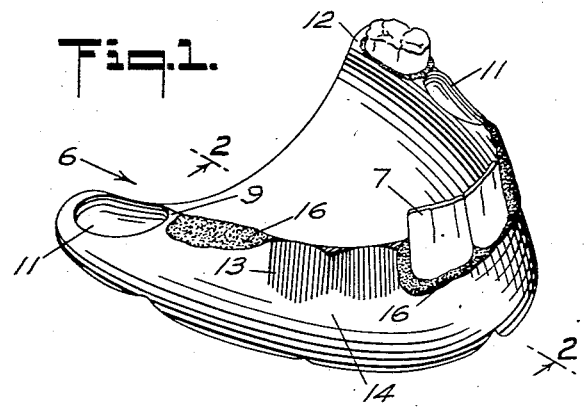
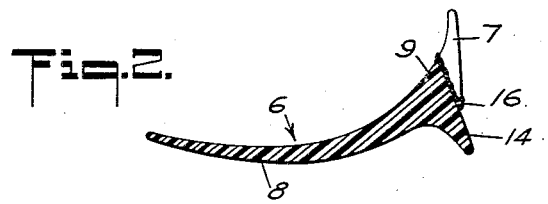
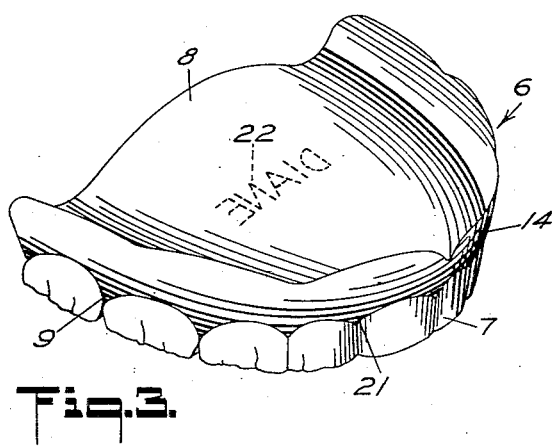
INVENTOR
CLYDE J. BRAUER

United States Patent Office 2,705,815
Patented Apr. 12, 1955

2,705,815

METHOD FOR COLLECTION AND MOUNTING OF CHILDREN'S TEETH

Clyde J. Brauer, Richmond, Calif.

Application April 19, 1952, Serial No. 283,201

2 Claims. (Cl. 18—55.1)

This invention generally relates to dental forms having gum and tooth portions, and more particularly to a method of assembling the so-called "baby teeth" of a child and mounting such teeth for preservation as a sentimental keepsake.

As is well known, the average child over two years of age is equipped with a set of ten deciduous teeth on both the upper and lower jaws, each set including four incisors, two canines and four molars. The formula of the permanent dentition in man includes four incisors, two canines, four premolars and six molars, for a total of sixteen teeth attached to each of the jaw bones. During the period of development of the child, the deciduous teeth gradually loosen and may be easily removed, thereby making room for the further growth of the permanent teeth. Thus, over a comparatively short period of time, the child will lose some twenty teeth, generally referred to as baby teeth or milk teeth, and such teeth are usually discarded by the child's parents. In numerous instances, the parents would like to preserve these small white teeth, primarily for sentimental reasons, but heretofore, there has been no convenient manner to effect such preservation. Likewise, the mere scattered collection of the teeth would not be particularly desirable or interesting.

With the foregoing in mind, it is therefore an object of the present invention to provide a method for ready collection and subsequent permanent mounting of the deciduous teeth of a child.

Another object of my invention is to provide a method of tooth collection and mounting of the type described in which at all times during the collection period and after the mounting, the individual teeth are disposed in their proper relative positions.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of the dental form used in carrying out present invention shown with several teeth releasably secured thereto.

Figure 2 is a cross-sectional view taken substantially in the plane indicated by the line 2—2 of Figure 1.

Figure 3 is a perspective view similar to Figure 1, but inverted and illustrating all of the child's deciduous teeth permanently mounted thereon.

As hereinabove mentioned, the present invention relates to a method for collecting and mounting the temporary teeth of a child. For reasons of simplicity in the drawing, only a single dental form is illustrated for receiving the upper set of such teeth, although it will be obvious that if both the upper and lower teeth are to be saved for subsequent permanent mounting, two of such forms will be utilized. It will of course also be understood that as the teeth are removed from the child's mouth, the same are to be placed in the now to be described dental form.

Referring first to Figures 1 and 2 of the drawing, the dental form, generally indicated by the numeral 6, is designed to releasably hold the teeth 7 of a child until all of the teeth are placed thereon. At such time, the form and teeth are permanently affixed together to provide a memento possessing sentimental value as well as a pleasing appearance. Form 6 is of a size generally conforming to the mouth size of an average child and is provided with an arcuately shaped body portion 8 and an integral peripherally extending ridge portion 9, such portions simulating the gum and jaw bones of the child. For simplicity of construction and attractiveness, I prefer to construct the form from one of the synthetic plastics, such as one of the acrylate polymers, vinyl polymers, or phenol-aldehyde resinoids and resins. The use of such materials in the construction of conventional dentures is well known in the art and no further discussion thereof is deemed necessary, except to add that it is desirable to have the form of a pinkish color to approximate the color of a person's gums.

In form 6, I provide a plurality of depressions or cavities positioned in accordance with average tooth spacing and arranged to receive the respective teeth of a child as the teeth are removed. It will therefore be noted that the depressions for the different type of teeth are somewhat different. In the case of the molar receiving means, depressions 11 are formed on the lower surface 12 of the ridge 9, while the canine and incisor tooth receiving means comprises depressions 13 positioned on the outer peripheral front surface 14 of the ridge. While such depressions will indicate the proper relative positions for the teeth, it is apparent that they are not fully adequate for maintaining the teeth 7 on the form. For this reason, I apply a layer 16 of a wax-like substance to the ridge portion 9, and by merely pressing the tooth into or towards the proper depression, the wax will releasably bond the tooth to the form. No particular wax is essential for an understanding of my invention, as any wax which will remain pliable over extended periods of time will be satisfactory, such as bees wax or the like.

After all ten of the deciduous baby teeth have been inserted in their proper cavities, it is then desirable to permanently secure the teeth to the form. This is advantageous not only for the purpose of insuring the permanent retention of the teeth on the form, but also to eliminate the tacky wax layer and substitute therefor an attractive and decorative bond, which appropriately forms an integral unit with the form and teeth.

In Figure 3 is illustrated the completed unit in which all of the teeth are permanently affixed to the denture form. It will be noted that the wax layer has been removed, the teeth 7 placed in their respective form cavities 11 and 13, and the form is built up around portions of the teeth as indicated at 21, by use of the same plastic material as that from which the remaining portions of the form was constructed. It will also be seen that in the finished product, only the crown portions of the teeth which are exposed in the human mouth are visible, as the root portions are covered by the built-up portion 21 of the form. The resulting product will therefore look similar to a conventional full denture, but is of course characterized by its small size and the fact that real teeth are mounted therein.

Although the child's parents may readily insert the individual teeth on the wax coated cavities for temporary retention, in order to build up the form around the base portions of the teeth, it will undoubtedly be necessary to have the form sent in to a central laboratory for completion. I also contemplate placing the child's name or initials on a portion of the form as suggested in the drawing at 22 to clearly identify the source of the real teeth disposed on the finished denture.

In any event, it is believed clear that by means of the above described invention, it will be possible to preserve a complete set of a child's teeth for many years in a novel and attractive form. Just as parents will often preserve such items as first shoes, etc. of a child, it is believed that they will likewise wish to preserve the actual baby teeth for a sentimental keepsake when such preservation becomes such a relatively simple matter.

I claim:

1. A method of collecting and preserving a set of deciduous teeth of a child on a dental form having a plurality of depressions thereon for receiving such teeth comprising, placing an adhesive tacky material over said depressions, sequentially inserting the teeth in said depressions and against said material so as to releasably bond said teeth to said form, continuing to so place said teeth in their proper relative positions until a complete set thereof is collected, removing said teeth and said material from said form, replacing said teeth on said form in their said relative positions and permanently securing said teeth in said depressions by covering the root portions and molding them into said dental form.

2. A method as set forth in claim 1 in which the material utilized for permanently securing said teeth in said depressions is substantially the same as the material used in said form.

References Cited in the file of this patent

UNITED STATES PATENTS

| | | |
|---|---|---|
| 85,927 | Haering | Jan. 19, 1869 |
| 315,319 | Morris | Apr. 7, 1885 |
| 908,627 | Telle | Jan. 5, 1909 |
| 2,491,147 | Zahn | Dec. 13, 1949 |
| 2,641,802 | Grant | June 16, 1953 |